US011585226B2

United States Patent
Galoul et al.

(10) Patent No.: US 11,585,226 B2
(45) Date of Patent: Feb. 21, 2023

(54) IMPINGEMENT INSERT FOR A TURBOMACHINE COMPONENT, TURBOMACHINE COMPONENT AND GAS TURBINE HAVING THE SAME

(71) Applicant: DOOSAN ENERBILITY CO., LTD., Changwon-si (KR)

(72) Inventors: Vincent Galoul, Baden (CH); Simon Hauswirth, Baden (CH); Richard Jones, Baden (CH)

(73) Assignee: DOOSAN ENERBILITY CO., LTD., Changwon (KR)

( * ) Notice: Subject to any disclaimer, the term of this patent is extended or adjusted under 35 U.S.C. 154(b) by 0 days.

(21) Appl. No.: 17/149,240

(22) Filed: Jan. 14, 2021

(65) Prior Publication Data

US 2021/0254477 A1 Aug. 19, 2021

(51) Int. Cl.
*F01D 5/18* (2006.01)
*F01D 11/00* (2006.01)

(52) U.S. Cl.
CPC ............ *F01D 5/189* (2013.01); *F01D 11/005* (2013.01); *F05D 2240/12* (2013.01);
(Continued)

(58) Field of Classification Search
CPC ........ F01D 5/189; F01D 11/005; F01D 9/065; F01D 5/187; F01D 11/003; F01D 5/188;
(Continued)

(56) References Cited

U.S. PATENT DOCUMENTS 3,806,275 A * 4/1974 Aspinwall ............... F01D 5/189
416/193 A
4,257,734 A * 3/1981 Guy ....................... F01D 9/041
415/115
(Continued)

FOREIGN PATENT DOCUMENTS

| EP | 2492442 | 8/2012 |
|----|---------|--------|
| GB | 2555632 | 9/2018 |
| WO | 2013041361 | 3/2013 |

OTHER PUBLICATIONS

"Elastic Deformation", 2016, www.corrosionpedia.com/definition/2104/elastic-deformation (Year: 2016).*
(Continued)

*Primary Examiner* — Brian P Wolcott
*Assistant Examiner* — Eric A Lange
(74) *Attorney, Agent, or Firm* — Harvest IP Law LLP

(57) ABSTRACT

An impingement insert for an airfoil of a turbomachine component is provided. The insert includes first and second body parts, each having inner and outer surfaces; and first and second contact parts provided on the outer surfaces of the first and the second body parts. The insert includes a flexible mechanical seal part between the body parts. A flow channel for cooling air is defined by the seal part and the inner surfaces of the body parts. One or both of the body parts include impingement holes. The insert has an elastic part connected to the body parts. When the elastic part is subjected to deformation, the elastic part is configured to apply a force, on the first and/or the second body parts, in a direction of increasing a separation between the first contact part and the second contact part.

14 Claims, 13 Drawing Sheets

(52) U.S. Cl.
CPC .... *F05D 2240/55* (2013.01); *F05D 2260/201* (2013.01); *F05D 2260/232* (2013.01)

(58) Field of Classification Search
CPC ...... F01D 5/183; F01D 25/12; F05D 2240/12; F05D 2240/55; F05D 2260/201; F05D 2260/232; F05D 2240/59; F05D 2220/32; F02C 7/18
See application file for complete search history.

(56) References Cited

U.S. PATENT DOCUMENTS

| | | | | |
|---|---|---|---|---|
| 5,516,260 | A * | 5/1996 | Damlis | F01D 5/189 |
| | | | | 415/115 |
| 6,439,847 | B2 * | 8/2002 | Taeck | F01D 5/189 |
| | | | | 415/12 |
| 2014/0219788 | A1 * | 8/2014 | Nilsson | F01D 5/188 |
| | | | | 29/451 |
| 2018/0163555 | A1 * | 6/2018 | Snider | F01D 11/003 |

OTHER PUBLICATIONS

KR Office Action, dated Jun. 30, 2022.

* cited by examiner

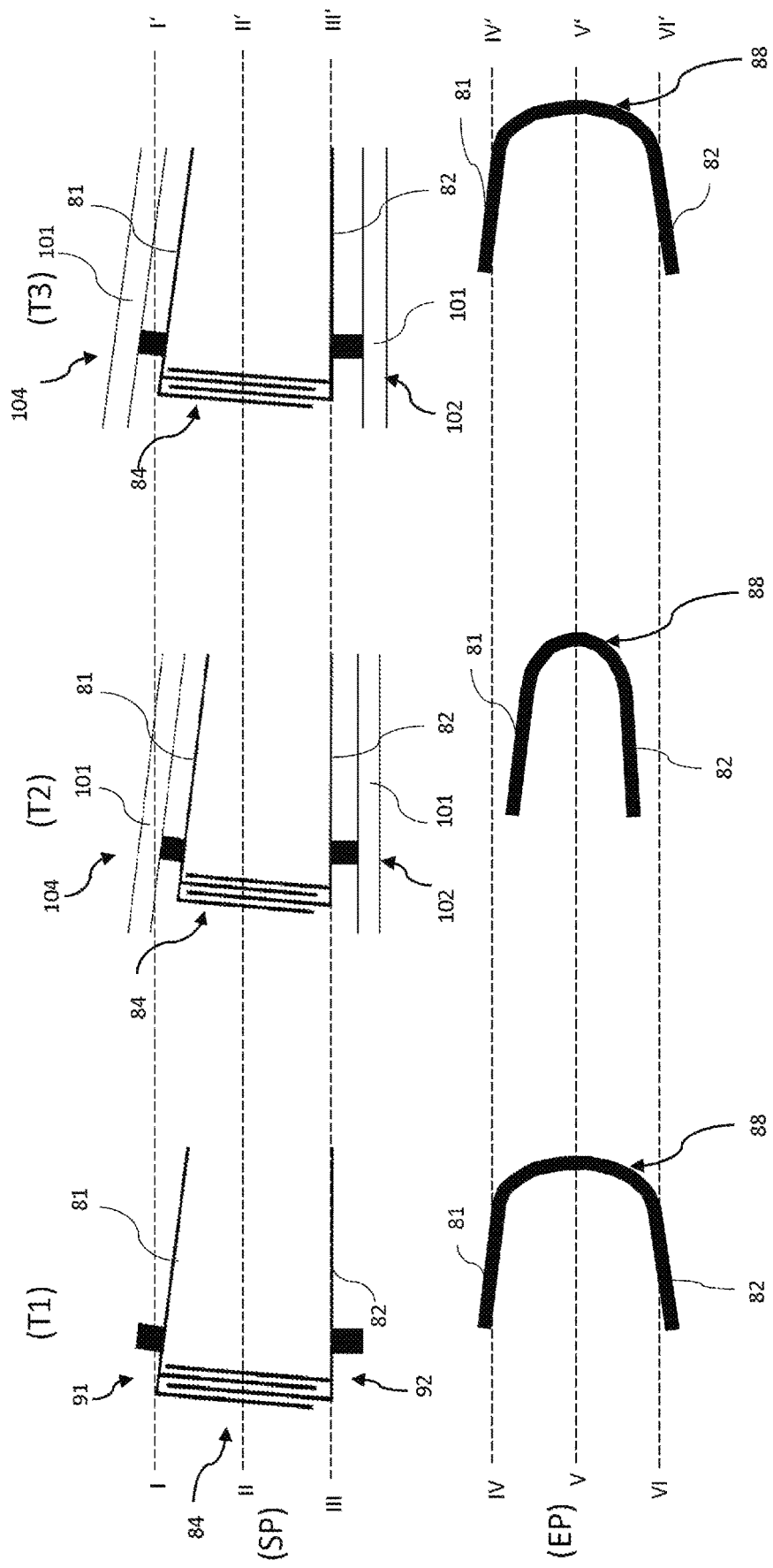

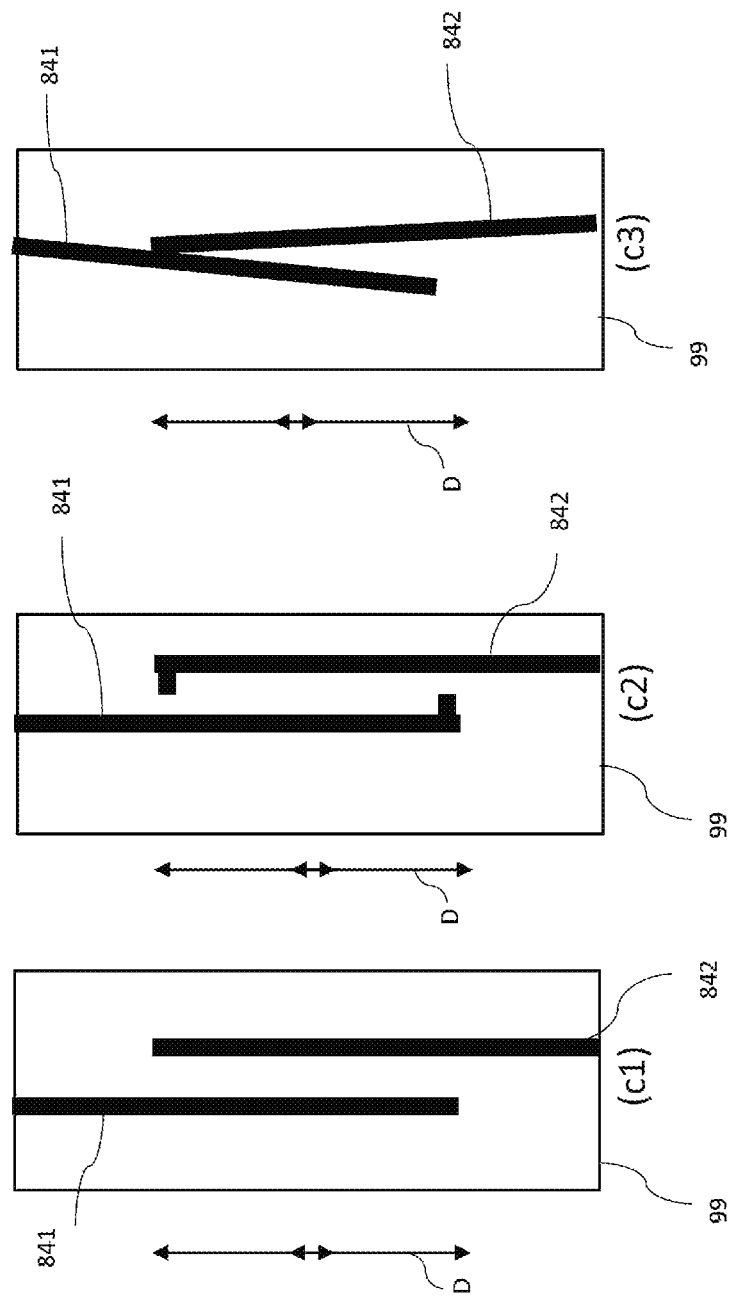

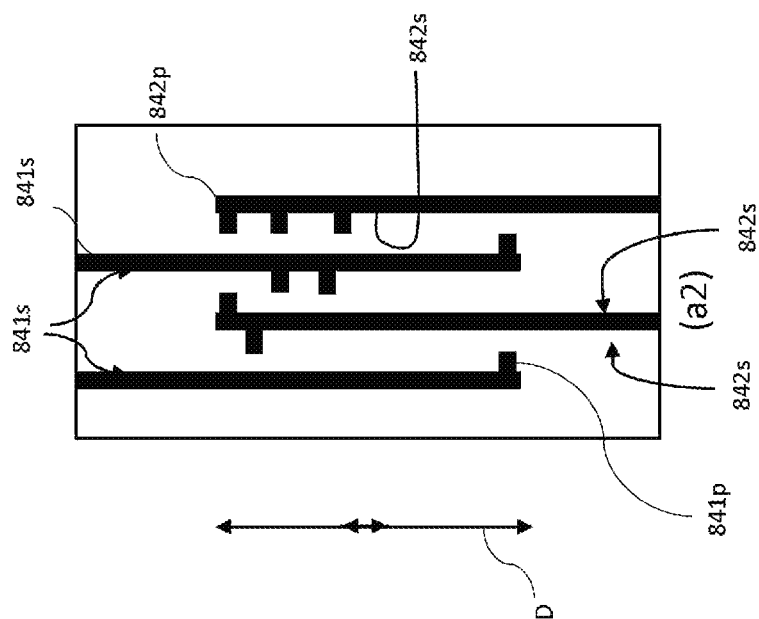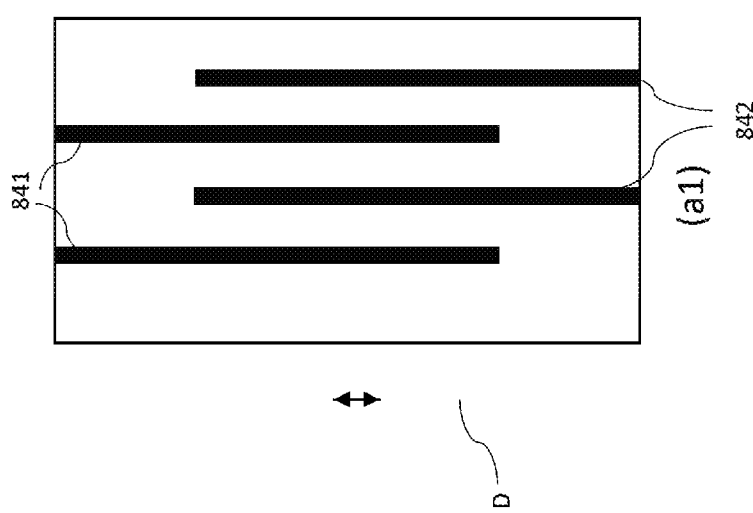
FIG 10

IMPINGEMENT INSERT FOR A TURBOMACHINE COMPONENT, TURBOMACHINE COMPONENT AND GAS TURBINE HAVING THE SAME

CROSS-REFERENCE TO RELATED APPLICATION(S)

This application claims priority to German Patent Application No. 10 2020 103 777.5, filed on Feb. 13, 2020 the disclosure of which is incorporated herein by reference in its entirety.

BACKGROUND OF THE INVENTION

Field of the Invention

The present invention relates to an impingement insert for a turbomachine component, turbomachine component and gas turbine having the same, and more particularly to impingement cooling of airfoils of gas turbines.

Description of the Related Art

Turbomachines include various turbomachine components that benefit from cooling, resulting into increased operational life of the components. By cooling of turbomachine components an increase in efficiency of the turbomachine is also realized.

Certain turbomachine components have an airfoil, e.g., a blade or a vane. The airfoils enclose internal spaces and are cooled internally or from the inside by flowing cooling air through the internal space of the airfoil or through one or more cooling channels formed in the internal space of the airfoil.

The turbomachine component—hereinafter also referred to as the blade or vane—generally comprises the airfoil (also referred to as an aerofoil) which extends along a longitudinal direction of the airfoil protruding from a platform. During operation of the gas turbine, the airfoil of the blade or the vane of the turbine section of the gas turbine are positioned in the hot gas path and are subjected to very high temperatures. The airfoils include pressure and suction sides that meet at leading and trailing edges and define the internal space of the airfoil. The internal space acts as a cooling channel. Alternatively, the airfoil also includes one or more webs that extend from the pressure side to suction side and thereby mechanically reinforce the pressure side and the suction side. The web, depending on the number of webs, divides the internal space of the airfoil into one or more cooling channels that extend along the longitudinal direction of the airfoil. Cooling air generally flows along the longitudinal direction of the airfoil in such cooling channels after being introduced into the airfoil. Enhancement of such internal cooling of the airfoil has beneficial effect on the efficiency of the gas turbine and/or on structural integrity of the airfoil.

It is commonly known to use impingement cooling of an inner surface of the airfoil, for example by using impingement inserts in the cooling channels. The impingement inserts have a body that longitudinally extends to define a flow channel. The body has impingement holes formed therein, generally perpendicular to the extension direction of the flow channel. The flow channel is for conducting flow of cooling air along a longitudinal direction of the airfoil; and the impingement holes eject air from the flow channel in form of impingement jets that are directed towards the inner surface of the airfoil which is the target for impingement cooling. For efficient cooling it is important that the impingement jets reach the target surface. However, when the gas turbine is operated, the airfoil wall is subjected to very high temperatures which may cause deformation or bulging in the airfoil wall and consequently increase a distance between the impingement holes and the target surface, thereby causing a decrease in efficiency of impingement cooling.

An object of the present disclosure is to provide a technique for efficient impingement cooling that addresses issue(s) relating to increase of a distance between the impingement holes and the target surface, that may generally be caused by high temperatures and/or mechanical vibrations.

SUMMARY OF THE INVENTION

The above object(s) is achieved by the features of the independent claims, in particular by an impingement insert for a turbomachine component. The above object(s) is also achieved by a turbomachine component having an airfoil and an impingement insert inserted into the airfoil of the turbomachine component. Advantageous embodiments of the present technique are provided in dependent claims.

Such turbomachine components that include an airfoil are exemplified hereinafter by a blade, however the description is also applicable to other turbomachine components that include an airfoil such as a vane, unless otherwise specified.

In a first aspect of the present technique, an impingement insert for a turbomachine component is provided. The turbomachine component may be any component of a gas turbine that includes an airfoil, e.g., the turbomachine component may be a blade or a vane. The impingement insert may be inserted in a cooling channel of a gas turbine to provide impingement cooling to surfaces of the cooling channel of the gas turbine. For example, the impingement insert may be inserted in a cooling channel of an airfoil of a gas turbine to provide impingement cooling to inner surfaces of the airfoil.

The impingement insert may include a first body part, a first contact part, a second body part, and a second contact part.

The first body part has an inner surface and an outer surface. Similarly, the second body part has an inner surface and an outer surface.

The first contact part may be at the outer surface of the first body part. The first contact part is configured to come in contact with, i.e., to meet, a surface of the turbomachine component, when the impingement insert is inserted in a cooling channel of a gas turbine, e.g., in a cooling channel of an airfoil of a gas turbine.

The second contact part may be at the outer surface of the second body part. The second contact part is configured to come in contact with, i.e., to meet, a surface of the turbomachine component, when the impingement insert is inserted in the cooling channel of the gas turbine e.g., the cooling channel of the airfoil of the gas turbine.

The impingement insert, hereinafter also referred to as the insert, may include a flexible mechanical seal part which may be disposed or positioned between the first body part and the second body part.

In the impingement insert, a flow channel for cooling air, may be defined by the flexible mechanical seal part and the inner surfaces of the first and the second body parts. At least one of the first and the second body parts, may include one or more impingement holes for ejecting impingement jets of cooling air from the flow channel towards surfaces of the cooling channel of the turbomachine component.

The insert may also include an elastic part connected to the first and the second body parts. When the elastic part is subjected to deformation under influence of an external force for example due to being squeezed into the cooling channel of the turbomachine component, the elastic part may be configured to apply a force, on the first and/or the second body parts, in a direction of increasing a separation or distance between the first contact part and the second contact part.

The elastic part and the first and the second body parts, may be formed integrally.

The elastic part may have a bent plate shape, and may be positioned between the first and the second body parts, to define, along with the seal part, the flow channel.

The seal part may be configured to maintain a sealed state while the separation between the first contact part and the second contact part is increased or decreased resulting from a deformation of the elastic part or from the force applied by the elastic part.

The seal part may include a first seal member extending from the first body part, and a second seal member extending from the second body part. The first seal member and the second seal member may extend towards each other and may be oriented relative to each other forming an overlapping region including at least a part of the first seal member and at least a part of the second seal member. The sealed state of the seal part may result due to the overlapping region.

The first seal member and the second seal member may be in contact with each other in the overlapping region to form the sealed state of the seal part.

The part of the first seal member and/or the part of the second seal member may be configured to slide relative to each other in a to-and-fro direction while maintaining contact with each other in the overlapping region.

Alternatively, the first seal member and the second seal member may be spaced apart from each other in the overlapping region to define a tortuous channel therebetween to form the sealed state of the seal part.

The first seal member and/or the second seal member are configured to move in a to-and-fro direction relative to each other while maintaining the tortuous channel.

At least one of the first seal member and the second seal member may have a corrugated shape having at least one groove. The groove may be configured or shaped to receive a part of the other of the first seal member and the second seal member and consequently forming an interdigitated arrangement in the overlapping region to form the sealed state of the seal part.

The first seal member may include a first surface and the second seal member may include a second surface. The first and the second surfaces may face each other in the overlapping region.

The first seal member may include one or more first protrusions which may extend from the first surface towards the second surface.

Alternatively, or in addition to the above, the second seal member may include one or more second protrusions which may extend from the second surface towards the first surface.

In a second aspect of the present technique, a turbomachine component for a gas turbine is presented. The turbomachine component may include an airfoil having an airfoil wall defining an internal space of the airfoil; at least one cooling channel formed in the internal space of the airfoil; and an impingement insert inserted into the cooling channel. The impingement insert may be according to the first aspect of the present technique described hereinabove. The first and the second contact parts, may be in contact with the airfoil wall e.g., the one of the first and the second contact parts may be in contact with a pressure side of the airfoil and other of the first and the second contact parts may be in contact with a suction side of the airfoil.

The elastic part of the impingement insert may be in deformed state due to the first and the second contact parts being in contact with the airfoil wall. In other words, the elastic part when being inserted is deformed so as to be squeezed between the airfoil walls, thereby bringing the first and the second contact parts closer to each other while being in contact with the airfoil wall. When the turbine is operated and when the temperatures increase, and if the airfoil wall experiences bulging or expansion, thereby tending to move away from the contact parts, the elastic part tends to push the contact parts into the airfoil wall due to the restorative force stored in the elastic part, thereby obviating separation of or increase in distance between the contact parts and the surface of the airfoil to which the contact parts are contacted. Thus, the insert is maintained firmly in place even when the distance between the airfoil walls increases, and also if decreases. Consequently, the first and/or the second body parts, comprising the impingement holes may be maintained at a desired distance from the surface of the airfoil to which the impingement jets are targeted. The surface of the airfoil to which the impingement jets are targeted and the surface of the airfoil to which the any of the contact parts are contacted may be the same surface of the airfoil e.g., inner surface of the airfoil wall on the pressure side and/or the suction side.

In a third aspect of the present technique a turbomachine assembly is presented. The turbomachine assembly may include the turbomachine component according to the second aspect of the present technique described hereinabove.

In a fourth aspect of the present technique a gas turbine is presented. The gas turbine includes a turbomachine component, which is according to the second aspect of the present technique described hereinabove. Alternatively, or in addition to the above, the gas turbine includes a turbomachine assembly, which is according to the third aspect of the present technique described hereinabove.

BRIEF DESCRIPTION OF THE DRAWINGS

The above mentioned attributes and other features and advantages of the present technique and the manner of attaining them will become more apparent and the present technique itself will be better understood by reference to the following description of embodiments of the present technique taken in conjunction with the accompanying drawings, wherein:

FIG. 5 schematically represents different states or conformations of parts of the impingement insert of the present technique illustrating working of the present technique;

FIG. 8 schematically illustrates various exemplary embodiments of the seal part of the impingement insert of the present technique;

FIG. 10 schematically illustrates various other exemplary embodiments of the seal part of the impingement insert of the present technique; in accordance with aspects of the present technique.

DESCRIPTION OF SPECIFIC EMBODIMENTS

Figure 1:
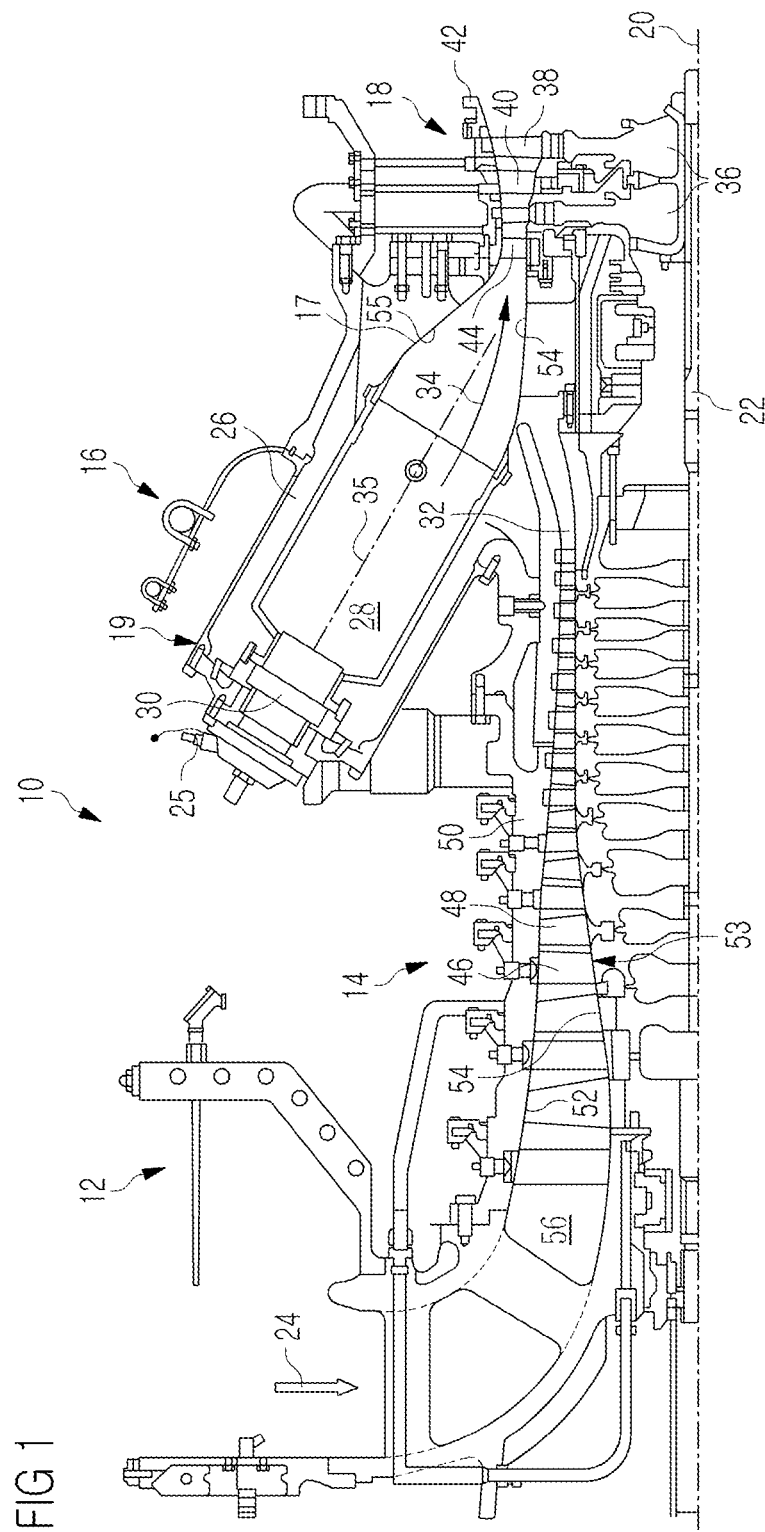
FIG. 1 shows part of an exemplary embodiment of gas turbine in a sectional view and in which an exemplary embodiment of a turbomachine component of the present technique may be incorporated.

Hereinafter, above-mentioned and other features of the present technique are described in detail. Various embodiments are described with reference to the drawing, wherein like reference numerals are used to refer to like elements throughout. In the following description, for purpose of explanation, numerous specific details are set forth in order to provide a thorough understanding of one or more embodiments. It may be noted that the illustrated embodiments are intended to explain, and not to limit the invention. It may be evident that such embodiments may be practiced without these specific details.

FIG. 1 shows an example of a gas turbine 10 in a sectional view. The gas turbine 10 may comprises, in flow series, an inlet 12, a compressor or compressor section 14, a combustor section 16 and a turbine section 18 which are generally arranged in flow series and generally about and in the direction of a longitudinal or rotational axis 20. The gas turbine 10 may further comprises a shaft 22 which is rotatable about the rotational axis 20 and which extends longitudinally through the gas turbine 10. The shaft 22 may drivingly connect the turbine section 18 to the compressor section 14.

In operation of the gas turbine 10, air 24, which is taken in through the air inlet 12 is compressed by the compressor section 14 and delivered to the combustion section or burner section 16. The burner section 16 may comprise a burner plenum 26, one or more combustion chambers 28 and at least one burner 30 fixed to each combustion chamber 28. The combustion chambers 28 and the burners 30 may be located inside the burner plenum 26. The compressed air passing through the compressor 14 may enter a diffuser 32 and may be discharged from the diffuser 32 into the burner plenum 26 from where a portion of the air may enter the burner 30 and is mixed with a gaseous or liquid fuel. The air/fuel mixture is then burned and the combustion gas 34 or working gas from the combustion is channeled through the combustion chamber 28 to the turbine section 18 via a transition duct 17.

This exemplary gas turbine 10 may have a cannular combustor section arrangement 16, which is constituted by an annular array of combustor cans 19 each having the burner 30 and the combustion chamber 28, the transition duct 17 has a generally circular inlet that interfaces with the combustor chamber 28 and an outlet in the form of an annular segment. An annular array of transition duct outlets may form an annulus for channeling the combustion gases to the turbine 18.

The turbine section 18 may comprise a number of blade carrying discs 36. The disked are tied by the shaft 22. In the present example, two discs 36 each carry an annular array of turbine blades 38 are depicted. However, the number of blade carrying discs could be different, i.e. only one disc or more than two discs. In addition, guiding vanes 40, which are fixed to a stator 42 of the gas turbine 10, may be disposed between the stages of annular arrays of turbine blades 38. Between the exit of the combustion chamber 28 and the leading turbine blades 38 inlet guiding vanes 44 may be provided and turn the flow of working gas onto the turbine blades 38.

The combustion gas from the combustion chamber 28 enters the turbine section 18 and drives the turbine blades 38 which in turn rotate the shaft 22. The guiding vanes 40, 44 serve to optimize the angle of the combustion or working gas on the turbine blades 38.

The turbine section 18 drives the compressor section 14. The compressor section 14 comprises an axial series of vane stages 46 and rotor blade stages 48. The rotor blade stages 48 may comprise a rotor disc supporting an annular array of blades. The compressor section 14 may also comprises a casing 50 that surrounds the rotor stages and supports the vane stages 48. The guide vane stages may include an annular array of radially extending vanes that are mounted to the casing 50. The vanes are provided to present gas flow at an optimal angle for the blades at a given turbine operational point. Some of the guide vane stages may have variable vanes, where the angle of the vanes, about their own longitudinal axis, can be adjusted for angle according to air flow characteristics that can occur at different gas turbine operations conditions. The casing 50 may define a radially outer surface 52 of the passage 56 of the compressor 14. A radially inner surface 54 of the passage 56 may be at least partly defined by a rotor drum 53 of the rotor which may be partly defined by the annular array of blades 48.

The present technique is described with reference to the above exemplary gas turbine having a single shaft or spool connecting a single, multi-stage compressor and a single, one or more stage turbine. However, it should be appreciated that the present technique is equally applicable to two or three shaft gas turbines and which can be used for industrial, aero or marine applications.

The terms upstream and downstream refer to the flow direction of the airflow and/or working gas flow through the gas turbine unless otherwise stated. The terms forward and rearward refer to the general flow of gas through the gas turbine. The terms axial, radial and circumferential are made with reference to the rotational axis 20 of the gas turbine, unless otherwise stated.

Figure 2A:
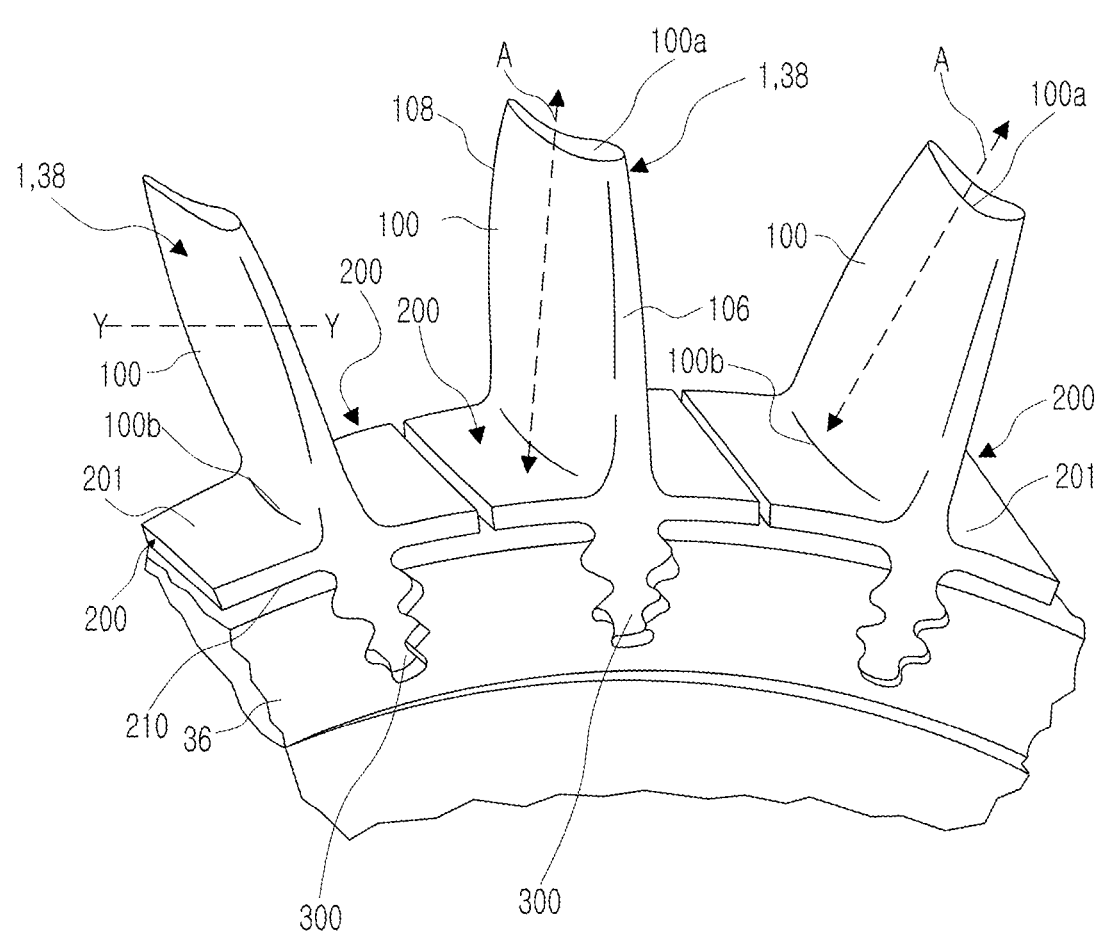
FIG. 2A is a perspective view illustrating an exemplary embodiment of a turbomachine assembly having an exemplary embodiment of the turbomachine component according to the present technique, exemplified by a blade in accordance with the present technique.
Figure 2B:
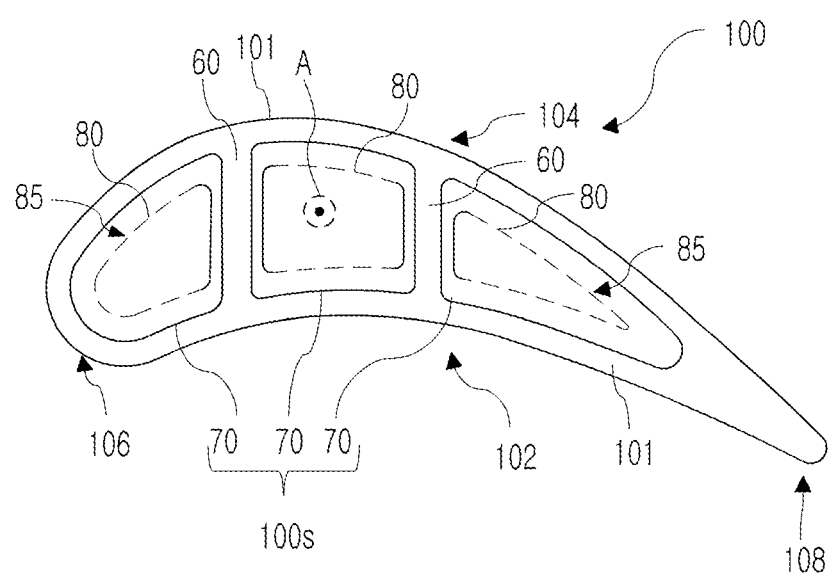
FIG. 2B is a cross-sectional view along the line Y-Y in FIG. 2A.

In the present technique, a turbomachine component 1 including an airfoil 100 is presented—as shown for example in FIGS. 2A and 2B. The turbomachine component 1 of the present technique may be the blade 38 of the gas turbine 10, described hereinabove, unless other specified. The turbomachine component 1 of the present technique may be the vane 40, 44 of the gas turbine 10, described hereinabove, unless other specified. Hereinafter, for sake of simplicity and brevity and not intended as a limitation unless otherwise specified, the turbomachine component 1 has been exemplified as, and has also been referred to as, a blade of the gas turbine, however it may be noted that the turbomachine component 1 according to the present technique may also be another turbomachine component 1 that includes an airfoil in accordance with the present technique.

FIGS. 2A and 2B schematically depict an example of a turbomachine component 1, exemplified by the blade 38 of the gas turbine 10. FIG. 2A schematically depicts an example of a turbomachine assembly. The assembly may include the turbine blades 38, as the turbomachine component 1, arranged on the rotor disk 36. The turbine blade 38 may include a platform 200, an airfoil 100 and optionally a root 300. The blade 38 may be fixed to or mounted onto the disk 36 via the root 300.

The turbomachine component 1 includes a platform 200 and an airfoil 100 extending from the platform 200. The platform 200 may include an upper surface 201 and a lower surface 210. The airfoil 100 may extend from the upper surface 201 of the platform 200. The upper surface 201 may extend circumferentially. Similarly, the lower surface 210 may extend circumferentially. The airfoil 100 extends radially outwards from the upper surface 201 of the platform 200.

The airfoil 100 includes an airfoil wall 101 that encloses an internal space 100*s* of the airfoil. The airfoil wall 101 may include a pressure side 102 (also referred to as pressure surface or concave surface/side) and a suction side 104 (also referred to as suction side or convex surface/side). The pressure side 102 and the suction side 104 meet each other at a leading edge 106 and a trailing edge 108 of the airfoil 100.

The airfoil 100 may have a base part 100*b* adjoining the platform 200 and a tip part 100*a* spaced apart from the base part 100*b* along a longitudinal direction A of the airfoil 100.

The pressure side 102, the suction side 104, the leading edge 106 and the trailing edge 108 define an internal space 100*s* of the airfoil 100. The internal space 100*s* of the airfoil 100 may be limited by the tip part 100*a* and the base part 100*b* of the airfoil 100.

The internal space 100*s* of the airfoil 100 may form a cooling channel 70 bound by the airfoil wall 101.

Alternatively, at least one web 60 may be disposed within the internal space 100*s* of the airfoil 100. The web 60 may extend between the pressure side 102 and the suction side 104. More precisely, each web 60 may extend between an inner surface of a wall of the airfoil 100 at the pressure side 102 of the airfoil 100 and an inner surface of the wall of the airfoil 100 at the suction side 104 of the airfoil 100. It may be noted that although the example of FIG. 2B shows two such webs 60, for exemplary purposes, the airfoil 100 may have 1 or 3 or more webs 60. Each of the webs 60 is connected to the pressure side 102 and the suction side 104. More precisely, each of the webs 60 may be connected to the inner surface of the pressure side wall and the inner surface of the suction side wall.

The wall of the airfoil 100 that includes the pressure side 102 and the suction side 104 and defines the leading edge 106 and the trailing edge 108 may also be referred to as the external wall of the airfoil 100 or as primary wall of the airfoil 100, besides being referred to as the airfoil wall 101. The airfoil wall 101 defines the external appearance of the airfoil 100, or in other words defines the airfoil shape.

Each of the web 60 may also be understood as formed by a wall in the airfoil 100, however the wall forming the web 60 is different than the airfoil wall 101 and may be referred to as internal wall or secondary wall of the airfoil 100.

As shown in the example of FIG. 2B, the internal space 100*s* of the airfoil 100 may include at least one cooling channel 70 for flow of cooling air 5. The cooling channels 70 may be understood as entire internal space 100*s* or as sub-divisions of the internal space 100*s* of the airfoil 100 created by the webs 60. It may be noted that although the example of FIG. 2B shows three such cooling channels 70, for exemplary purposes, the airfoil 100 may have 1 or 2 or 4 or more of such cooling channels 70.

The cooling air 5 may be provided into the cooling channel 70 from outside the airfoil 100, for example by cooling air flow paths (not shown) formed in the root 300 of the blade 1. Alternatively, or in addition to the above, the cooling air 5 may be provided into the cooling channel 70 from another, preferably adjacent, cooling channel 70 of the airfoil 100, wherein the cooling air is made to make a U-turn at the tip part 100*a* or the base part 100*b* of the airfoil thereby flowing out of a first cooling channel 70 and then flowing into a second cooling channel 70 from a top or bottom side, with respect to direction A, of the cooling channel.

The cooling channel 70 may extend along the longitudinal direction A of the airfoil 100, as shown in the example of FIGS. 2A and 2B. As shown in the example of FIG. 2B, each cooling channel 70 of the airfoil may be defined by one or more of the webs 60 and the pressure side 102 and the suction side 104. The example of FIG. 2B shows a first cooling channel 70 defined by one of the webs 60, a part of the pressure side 102, a part of the suction side 104 and the leading edge 106. The example of FIG. 2B also shows a second cooling channel 70 defined by one of the webs 60, a part of the pressure side 102, a part of the suction side 104 and the trailing edge 108. Furthermore, the example of FIG. 2B shows a third cooling channel 70 defined by two adjacent webs 60 facing each other, a part of the pressure side 102, and a part of the suction side 104. The third cooling channel may be understood as the cooling channel between the first and the second cooling channel, and may also be present in a plurality.

Figure 3:
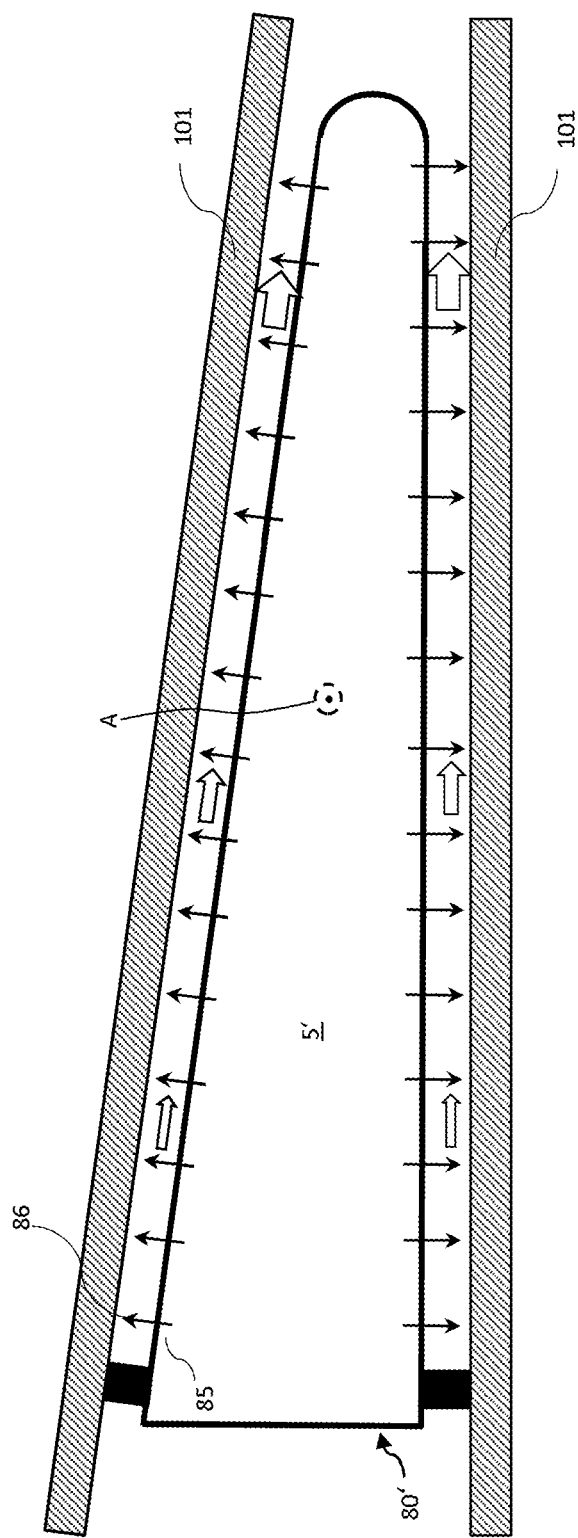
FIG. 3 schematically represents a cross-sectional view of a part of a conventional airfoil having a conventional impingement insert.

FIG. 2B also shows a schematic representation of one or more impingement inserts 80 according to the present technique inserted or positioned in the cooling channel 70. The impingement insert 80 according to the present technique is explained hereinafter with reference to FIGS. 4A and 4B. A conventional impingement insert 80' is shown in FIG. 3 for comparative understanding.

The impingement inserts 80 (hereinafter also referred to as the insert 80) may generally be understood as a component inserted in the cooling channel 70 that includes one or more impingement holes 85 for ejecting impingement jets 86 of cooling air towards the inner surface of the airfoil wall, preferably towards the pressure side 102 and/or the suction side 104 of the airfoil 100 and/or towards the leading edge 106 and/or towards the trailing edge 108 of the airfoil 100 for the purpose of impinging onto the inner surface (hereinafter also referred to as the target surface) of the airfoil 100 to provide cooling of the target surface.

The impingement insert 80 may be inserted in the cooling channel 70 of the turbomachine component 1, which may be the blade 38 or the vane 40, 44, of the gas turbine 10 to provide impingement cooling to an inner surface of the airfoil wall 101 that forms the cooling channel 70 in the airfoil 100 of the turbomachine component 1 of the gas turbine 10.

Figure 4A:
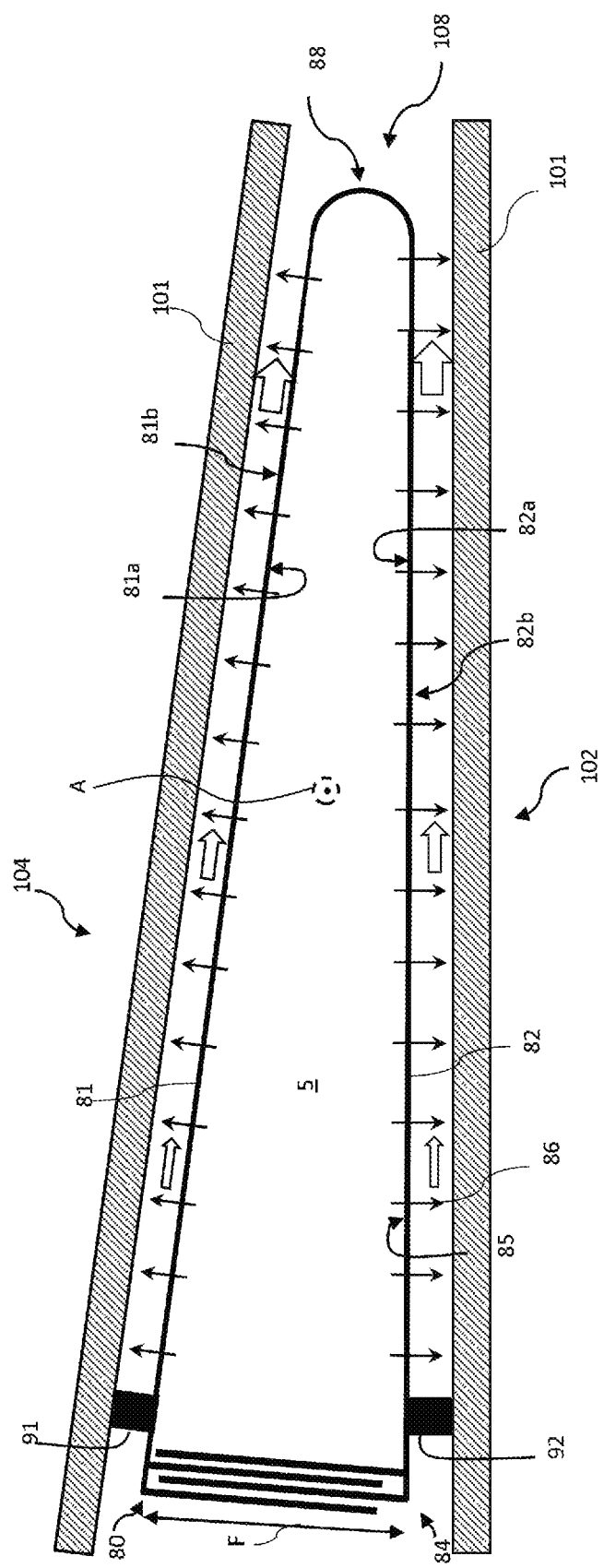
FIG. 4A schematically represents a cross-sectional view of a part of an airfoil having an exemplary embodiment of an impingement insert, according to the present technique.
Figure 4B:
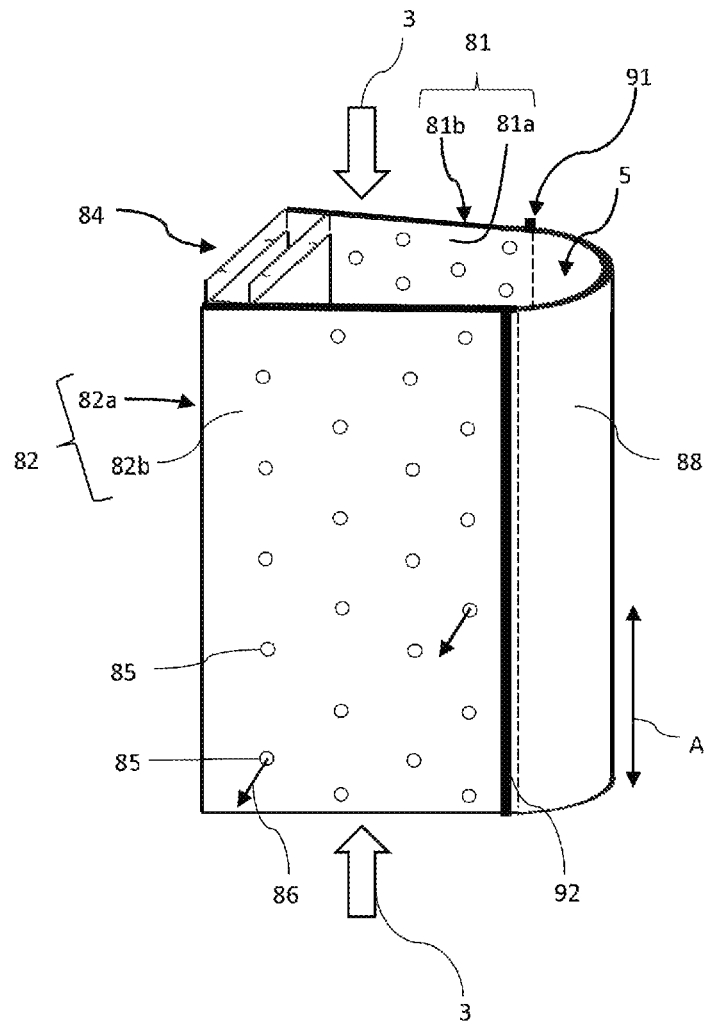
FIG. 4B schematically represents a perspective view of an exemplary embodiment of the impingement insert, according to the present technique.

As shown in FIGS. 4A and 4B, the impingement insert 80 may include a first body part 81, a first contact part 91, a second body part 82, and a second contact part 92.

The first and/or the second body parts 81, 82 may be plate shaped or may be formed as a sheet, for example a metal sheet or metal plate.

The first body part 81 has an inner surface 81a and an outer surface 81b. Similarly, the second body part 82 has an inner surface 82a and an outer surface 82b.

The inner surfaces 81a, 82a of the first and the second body parts 81, 82 may face each other, whereas the outer surfaces 81b, 82b of the first and the second body parts 81, 82 may face away from each other.

At least one of the first and the second body parts 81, 82 may include one or more impingement holes 85 for ejecting impingement jets 86.

The first contact part 91 may be at the outer surface 81b of the first body part 81, in other words the first contact part 91 may disposed at the outer surface 81b of the first body part 81. The first contact part 91 may be formed as a protrusion on the outer surface 81b of the first body part 81. The first contact part 91 may protrude outwardly, e.g., towards the inner surface of the airfoil wall 101, from the outer surface 81b of the first body part 81. The first contact part 91 may be formed as a longitudinally extending protrusion, i.e., extending in the direction A as shown in FIG. 4B, and also in FIGS. 2A and 2B, formed on the outer surface 81b of the first body part 81.

The first contact part 91 functions to contact a surface, i.e., the inner surface of the airfoil of the turbomachine component 1, when the impingement insert 80 is inserted in the cooling channel 70 of the gas turbine 10.

The second contact part 92 may be at the outer surface 82b of the second body part 82, in other words the second contact part 92 may disposed at the outer surface 82b of the second body part 82. The second contact part 92 may be formed as a protrusion on the outer surface 82b of the second body part 82. The second contact part 92 may protrude outwardly, e.g., towards the inner surface of the airfoil wall 101, from the outer surface 82b of the second body part 82. The second contact part 92 may be formed as a longitudinally extending protrusion, i.e., extending in the direction A as shown in FIG. 4B, and also in FIGS. 2A and 2B, formed on the outer surface 82b of the second body part 82.

The second contact part 92 functions to contact a surface, i.e., the inner surface of the airfoil of the turbomachine component 1, when the impingement insert 80 is inserted in the cooling channel 70 of the gas turbine 10.

The first and the second contact parts 91, 92 may face away from each other.

When the impingement insert 80 is inserted in the cooling channel 70 of the airfoil 100, the first and the second contact parts 91, 92 contact the inner surface of the airfoil wall 101, and thus the impingement insert 80 is held in place/position within the cooling channel 70 or in other words the impingement insert 80 is supported by the surfaces of the cooling channel 70.

The first and/or the second contact parts 91, 92 may also function to maintain a separation between the inner surface of the airfoil wall 101 and the outer surfaces 81b, 82b of the body parts 81, 82, and consequently between the inner surface of the airfoil wall 101 and the body parts 81, 82, and therefore between the inner surface of the airfoil wall 101, which is the target surface of the impingement jets, and the impingement holes 85 formed through the body parts 81, 82.

Therefore, the impingement jets 86 ejected from the impingement holes 85 have a required separation from the inner surface of the airfoil wall 101 which is the target of the impingement cooling.

The impingement insert 80 may also include a flexible mechanical seal part 84 which may be disposed or positioned between the first body part 81 and the second body part 82.

In the impingement insert 80, a flow channel 5 for cooling air, may be defined by the flexible mechanical seal part 84 and the inner surfaces 81a, 82a of the first and the second body parts 81, 82. The cooling air flows into the flow channel 5 in the direction either from an upper side or a base side of the impingement insert 80 as depicted by the arrows marked by reference numeral 3 in FIG. 4B. The cooling air when flowing in the flow channel 5 encounters the impingement holes 85 and is ejected out of the flow channel 5 as the impingement jets 86 through the impingement holes 85.

As shown in FIGS. 4A and 4B, the impingement insert 80 may also include an elastic part 88 connected to the first and the second body parts 81, 82.

When the elastic part 88 is subjected to deformation, for example under influence of an external force such as when the impingement insert 80 is squeezed and inserted in squeezed state into the cooling channel 70, the elastic part 88 may be configured to apply a force F, on the first and/or the second body parts 81, 82 in a direction of increasing a separation between the first contact part 91 and the second contact part 92.

In other words, the elastic part 88 is loaded by the external deformative force and consequently a restorative elastic force is stored in the elastic part 88 which tends to bring the impingement insert 80 back to its initial shape, for example back to its un-squeezed shape or default shape.

In other words, the flow channel 5 for cooling air, may at least be defined by the inner surfaces 81a, 82a of the first and the second body parts 81, 82, and optionally may also be defined by the elastic part 88 as depicted in FIGS. 4A and 4B. The flow channel 5 may extend longitudinally i.e. along the direction A, when the impingement insert 80 is in an inserted position in the airfoil 100. The inner surfaces 81a, 82a of the first and the second body parts 81, 82, and optionally also the elastic part 88, may define parts of the lateral surfaces of the flow channel 5. The flexible mechanical seal part 84 may also define part of the lateral surface of the flow channel, and may function to seal or prevent unintended leakage of air from the lateral side of the flow channel 5 of the insert e.g. any leakage of cooling air at the lateral side of the flow channel 5 other than the cooling air ejected as impingement jets 86.

Simply put, lateral walls or side of the flow channel 5 may be de defined by the inner surfaces 81a, 82a of the first and the second body parts 81, 82, which are interconnected by the elastic part 88 and the seal part 84. The inner surfaces 81a, 82a of the first and the second body parts 81, 82 may face each other. Similarly, the elastic part 88 and the seal part 84 may face each other. One or more or all of the first and the second body parts 81, 82, elastic part 88 and the seal part 84 may be realized as plates or sheets, preferably metallic sheets. The sheet forming the elastic part may be bent along its longitudinal axis, parallel to direction A, to form a bent structure as shown in FIGS. 4A and 4B.

Figure 7A:
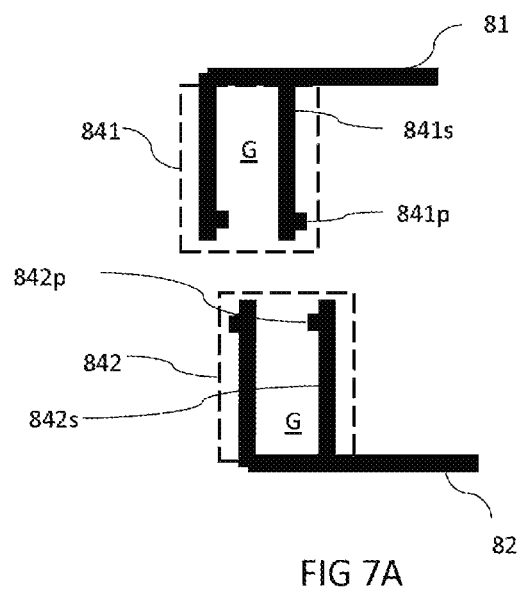
FIG. 7A schematically illustrates an unsealed state of an exemplary embodiment of a seal part of the impingement insert of the present technique.
Figure 7B:
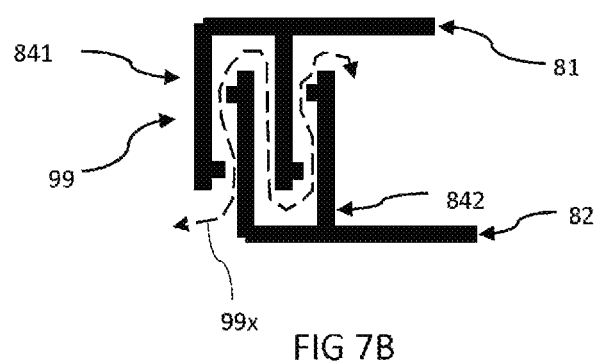
FIG. 7B schematically illustrates a sealed state of the seal part of the impingement insert of FIG. 7A.

The seal part 84 is referred to as mechanical because it includes mechanical members that engage or orient relative to each other to form a sealed state—i.e. a state in which unintended leakage of cooling air from the lateral side of the flow channel 5 is obviated, partially or completely. FIG. 7A shows unsealed state and FIG. 7B shows an exemplary embodiment of sealed state.

The seal part 84 is referred to as flexible because the mechanical members that engage or orient relative to each other to form the sealed state are moveable relative to each other, for example when the elastic part 88 is deformed or relaxed. The mechanical members of the seal part 84 are configured to maintain the sealed state while such movement of the mechanical members is occurring i.e. during the movement, and also after the movement halts.

In simple words, in the inserted state i.e., when inserted in the cooling channel 70 of the airfoil 100, even when the contact parts 91, 92 move away from each other the seal part 84 maintains the sealed state while such movement of the contact parts 91, 92 is occurring, and also after the movement halts. Also, in the inserted state, even when the contact parts 91, 92 move closer to each other the seal part 84 maintains the sealed state while such movement of the contact parts 91, 92 is occurring, and also after the movement halts.

In other words, there may be three possibilities in the inserted state i.e. a state in which the impingement insert 80 is in an inserted position into the cooling channel 70—first, that the contact parts 91, 92 are at first distance of separation; second, that the contact parts 91, 92 are at second distance of separation which is different from the first distance; and third, that relative movement of the contact parts 91, 92, caused by movement of either or both of the contact part 91, 92, is ongoing so that the contact parts 91, 92 move from the first separation distance to the second separation and/or vice versa (to-and-from movement). The seal part 84 is configured to maintain the sealed state during all the three above-mentioned possibilities. By maintaining the sealed state, a pressure of the cooling air inside the flow channel 5 of the impingement insert 80 is maintained, which in turn ensures formation of impingement jets 86 with desired strength.

The elastic part 88 may be formed of an elastic material, for example a shaped or bent metal plate having a thickness which imparts elasticity to the plate. The elastic part 88 is configured to deform, when adequate force (a deformative external force e.g., a stress or squeezing) is applied to the impingement insert 80—thereby causing a change in overall shape of the impingement insert 80 e.g. bringing the two body parts 81, 82 closer together and consequently bringing the two contact parts 91, 92 closer together. However, the elastic part 88 tends to return and/or returns completely or partially to its initial shape (shape prior to being subjected to the deformative external force) when the external deformative force on the impingement insert 80 is removed or reduced, thereby tending to restore or restoring a separation distance between the two body parts 81, 82 and consequently increasing separation between the two contact parts 91, 92.

The elastic part 88 and the first and the second body parts 81, 82 may be formed integrally. In other words, the elastic part 88, the first and the second body parts 81, 82 may all be formed of one sheet, for example a folded metal sheet.

The elastic part 88 may have a bent plate shape, and may be positioned between the first and the second body parts 81, 82 to define, along with the seal part 84, the flow channel 5.

As depicted in FIGS. 4A and 4B, the seal part 84 and the elastic part 88 may be connected to each other by the body parts 81, 82, and preferably be spaced apart to be at opposing ends or edges of the body parts 81, 82. The contact parts 91, 92 may be located between the seal part 84 and the elastic part 88.

Hereinafter, with reference to FIG. 5, a working of the impingement insert 80 has been explained. FIG. 5 depicts three exemplary time instances.

First is a time instance 'T1' when the impingement insert 80 has not been inserted into the cooling channel 70, the state of the insert 80 during the time instance T1 may also be referred to as the default state. The default state may also be understood as a state in which no external deformative force is acting on the impingement insert 80.

Second is a time instance 'T2' when the impingement insert 80 has been inserted into the cooling channel 70 however the turbine is non-operational or is operating at low temperatures or low speed and thus there is no bulging and/or high vibration in the airfoil wall 101. The state of the impingement insert 80 at the time instance T2 may be referred to as deformed state. The deformed state may also be understood as a state in which a deformative force is acting on the impingement insert 80.

Third is a time instance 'T3' after the impingement insert 80 has been inserted into the cooling channel 70 and when the turbine is operational at high temperatures and/or high speed and experiencing bulging and/or high vibration in the airfoil wall 101. The state of the impingement insert 80 at the time instance T3 may be referred to as restored state. The restored state may also be understood as a state in which the deformative force which was acting on the impingement insert 80 is either partially or completely removed.

In FIG. 5, 'SP' represents the states of the seal part 84 at the different time instances T1, T2, T3, and 'EP' represents the states of the elastic part 88 at the different time instances T1, T2, T3. The lines I-I' to and lines IV-IV' to VI-VI' present an imaginary reference frame to understand separation between parts of the impingement insert 80 and/or conformation of the parts of the impingement insert 80.

As shown in FIG. 5, during the time instance T1, the impingement insert 80 is in the default state, for example in a state when manufactured i.e. prior to use.

Thereafter, the impingement insert 80 is squeezed bringing the contact parts 91, 92 closer and then inserted into the airfoil 100 to be abutted against the airfoil wall 101, at opposing sides for example at the pressure side 102 and the suction side 104 of the airfoil 100 as shown for time instance T2 representing the deformed state in which the elastic part 88 is deformed. In the inserted state, i.e. the deformed state, the impingement insert 80 is in squeezed state i.e. the elastic part 88 is deformed and therefore stores a restorative force therein, which continuously or constantly maintains a pushing force at one or both of the contact parts 91, 92 towards the airfoil wall 101, thereby tending to increase a separation distance between the contact parts 91, 92. However, increase in separation distance does not occur at time instance T2 since the airfoil wall 101 keeps the contact parts 91, 92 squeezed or in other words keeps or maintains the elastic part 88 in deformed state.

However, if subsequently after the time instance T2, there arrives the time instance T3 in which either due to thermal or mechanical stresses a separation between the opposing airfoil walls 101 i.e. between the pressure side part of the airfoil wall 101 and the suction side part of the airfoil wall 101 is changed, e.g. increased, then the restorative force of the elastic part 88 pushes the contact parts 91, 92 further apart, thereby maintaining contact between the contact parts 91, 92 and the inner surface of the airfoil wall 101.

It may also be noted that either after the time instance T2 or after the time instance T3, if a separation between the opposing airfoil walls 101 i.e. between the pressure side part of the airfoil wall 101 and the suction side part of the airfoil wall 101 is decreased, then the elastic nature of the elastic part 88 and the flexible mechanical seal part 84 ensure that the contact parts 91, 92 are pushed together towards each other without causing undesired deformation in parts of the insert 80, e.g. without crushing of parts of the impingement insert 80.

As shown in FIG. 5, the seal part 84 may be configured to maintain the sealed state while the separation between the first contact part 91 and the second contact part 92 is increased or decreased resulting from a deformation of the elastic part 88 or from the force applied by the elastic part 88.

Hereinafter, with reference to FIGS. 6A to 10 various embodiments of the impingement insert 80 are explained.

As shown in FIGS. 6A to 6C and FIGS. 7A and 7B, the seal part 84 may include a first seal member 841 extending from the first body part 81, and a second seal member 842 extending from the second body part 82.

The first seal member 841 and the second seal member 842 may extend towards each other and may be oriented relative to each other forming an overlapping region 99 that includes at least a part of the first seal member 841 and at least a part of the second seal member 842. The sealed state of the seal part 84 may result due to the overlapping region 99.

Figure 6A:
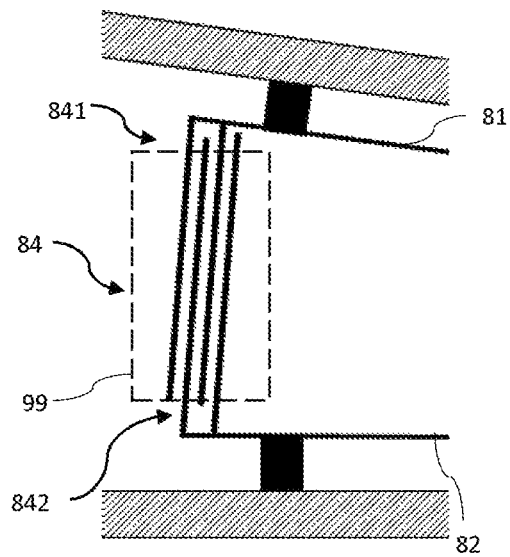
FIGS. 6A to 6C schematically represent various exemplary embodiments of the impingement insert of the present technique.

As depicted in FIG. 6A, each seal member 841, 842 includes a digitated structure, each having a plurality of digits. The digits of the seal member 841, 842 may be shaped to have an interdigitated interlocking in the overlapping region 99 to form the sealed state.

Figure 6B:
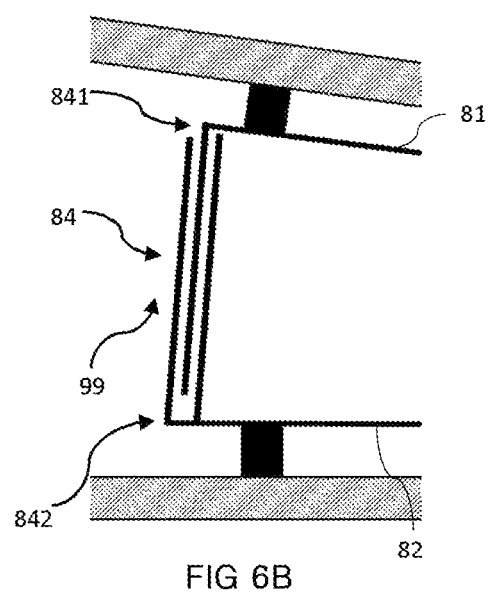

Alternatively, as shown in FIG. 6B, only one of the seal members 841, 842 includes a digitated structure having a plurality of digits, while the other of the seal member 841, 842 includes a unitary digit. The seal member 841, 842 having the plurality of digits may be shaped to receive the unitary digit of the seal member 841, 842 to form an interdigitated interlocking in the overlapping region 99 to form the sealed state.

Figure 6C:
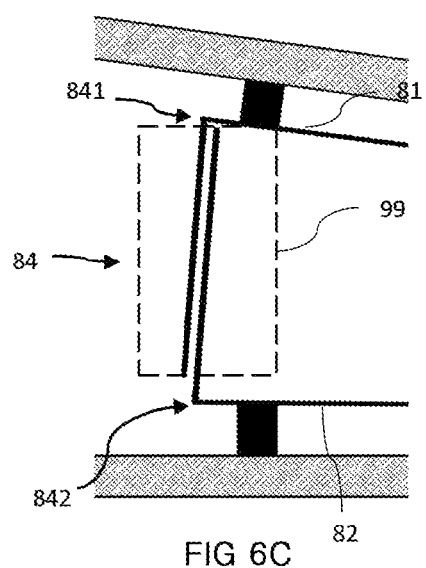

Alternatively, as shown in FIG. 6C, each of the seal member 841, 842 includes a unitary digit structure, which may be overlapped in the overlapping region 99 to form the sealed state.

A digit structure may be understood as a structure in which one or more elements, e.g., plate like elements (referred to as digits), protrudes out of a surface (referred to as supporting surface) of another element. When there are multiple of digits present the digits are disposed next to each other.

A cross-section of a unitary digit structure, i.e., the one digit and the supporting surface from which the digit protrudes, may resemble a 'T' shape wherein the top bar of 'T' represents the supporting surface and the bottom part of 'T' represents the protruding digit.

A cross-section of digit structure with multiple digits, i.e., multiple digits and the supporting surface from which the multiple digits protrude, may resemble fingers outstretched from edge of palm of hand, wherein the edge of the palm represents the supporting surface from which the digits protrudes, and the fingers represent the protruding digits.

The digit(s) may protrude out of the surface substantially perpendicularly or at an angle e.g., an angle between 30 and 90 degrees. The digits may be parallel to each other.

The overlapping region 99 may be formed either by contact relationship between the seal member 841, 842, i.e., when the digits are touching each other, or by non-contact or spaced apart relationship between the seal member 841, 842, i.e., when the digits are not touching each other.

FIG. 8 represents various exemplary embodiments of FIG. 6C represented as (c1), (c2) and (c3). Parts (c1) and (c2) of FIG. 8 represent non-contact or spaced apart relationship, in the overlapping part 99, between the seal member 841, 842 when both the seal members 841, 842 have unitary digit structure. Part (c3) of FIG. 8 represents contact relationship in the overlapping part 99, between the seal member 841, 842 when both the seal members 841, 842 have unitary digit structure.

Figure 9:
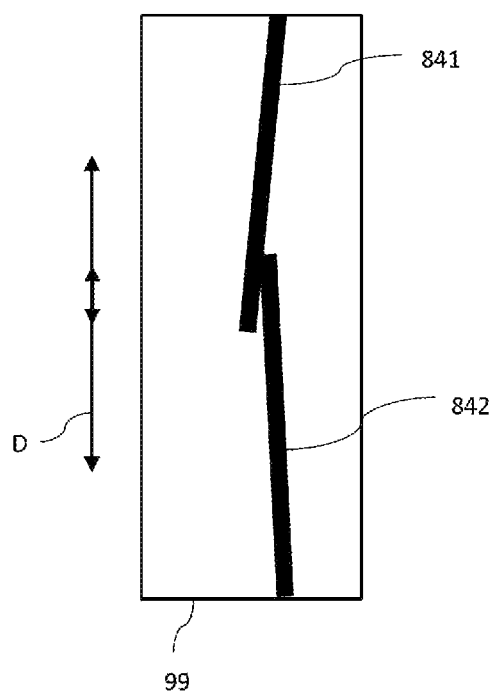
FIG. 9 schematically illustrates working of an exemplary embodiment of the seal part of the impingement insert of the present technique.

As shown in FIG. 9, the part of the first seal member 841 and/or the part of the second seal member 842 may be configured to slide relative to each other in a to-and-fro direction D while maintaining contact with each other in the overlapping region 99.

Alternatively, as shown in FIGS. 6A and 6B and FIG. 7B, the first seal member 841 and the second seal member 842 may be spaced apart from each other in the overlapping region 99 to define a tortuous channel 99x thereinbetween to form the sealed state of the seal part 84. The tortuous channel 99x is a spacing between the seal member 841, 842, more particularly between the digit(s) of one of the seal members 841, 842, and the digit(s) of the other of the seal members 841, 842, which has a twisted shape, as shown by arrow 99x in FIG. 7B, so as to form sealed state, for example as in a labyrinth seal. The twisted shape inhibits flow of cooling air from the flow channel 5 through the tortuous channel 99x, i.e., inhibits undesired lateral flow of the cooling air.

As can be understood from comparing representation of SP (seal part) at time instances T2 and T3 shown in FIG. 5 in combination with representation of FIGS. 6A and 10, the first seal member 841 and/or the second seal member 842 are configured to move in a to-and-fro direction D relative to each other while maintaining the tortuous channel 99x as shown in FIG. 7B.

As shown in FIGS. 7A and 7B, at least one of the first seal member 841 and the second seal member 842 may have a corrugated shape having at least one groove G. The groove G may be configured to receive a part of the other of the first seal member 841 and the second seal member 842, consequently forming an interdigitated arrangement as shown in FIG. 7B, in the overlapping region 99 to form the sealed state of the seal part 84.

As shown in FIGS. 7A, 7B, 8(c2), and 10(a2), the first seal member 841 may include a first surface 841s and the second seal member 842 may include a second surface 842s. The first and the second surfaces 841s, 842s may face each other in the overlapping region 99.

The first seal member 841 may include one or more first protrusions 841p which may extend from the first surface 841s towards the second surface 842s.

Alternatively, or in addition to the above, the second seal member 842 may include one or more second protrusions 842p which may extend from the second surface 842s towards the first surface 841s.

As depicted in FIG. 10(a2), one or more protrusions 841p may extend in opposite directions from the first seal member 841, for example from opposite surfaces of the first seal member 841.

Alternatively, or in addition to the above, one or more protrusions 842p may extend in opposite directions from the second seal member 842, for example from opposite surfaces of the second seal member 842.

As shown in FIGS. 8(*c*1) and (*c*2), and 10(*a*1), the first surface 841*s* and/or the second surface 842*s* of the first seal member 841 and/or the second seal member 842 may not have the protrusions 841*p*, 842*p*, i.e., may be planar surfaces, in the overlapping region 99.

While the present technique has been described in detail with reference to certain embodiments, it should be appreciated that the present technique is not limited to those precise embodiments. Rather, in view of the present disclosure which describes exemplary modes for practicing the invention, many modifications and variations would present themselves, to those skilled in the art without departing from the scope of the appended claims. The scope of the invention is, therefore, indicated by the following claims rather than by the foregoing description. All changes, modifications, and variations coming within the meaning and range of equivalency of the claims are to be considered within their scope.

What is claimed is:

1. An impingement insert for a turbomachine component, the impingement insert comprising:
   a first body part having an inner surface and an outer surface;
   a first contact part at the outer surface of the first body part and configured to contact the turbomachine component, the first contact part being a longitudinally extending protrusion formed on the outer surface of the first body part;
   a second body part having an inner surface and an outer surface;
   a second contact part at the outer surface of the second body part and configured to contact the turbomachine component, the second contact part being a longitudinally extending protrusion formed on the outer surface of the second body part;
   a flexible mechanical seal part between the first body part and the second body part;
   a flow channel for cooling air, defined by the flexible mechanical seal part and the inner surfaces of the first and the second body parts, and wherein at least one of the first and the second body parts includes one or more impingement holes for ejecting impingement jets of cooling air from the flow channel; and
   an elastic part connected to the first and the second body parts and configured to apply a force, when deformed, on the first and/or the second body parts in a direction of increasing a separation between the first contact part and the second contact part,
   wherein the seal part is configured to be spaced apart from the turbomachine component and comprises a first seal member extending from the first body part and a second seal member extending from the second body part, the first seal member and the second seal member extending towards each other forming an overlapping region to form a sealed state of the seal part, the overlapping region including at least a part of the first seal member and at least a part of the second seal member, and
   wherein the first seal member and the second seal member are configured to slide relative to each other in a direction of increasing a separation between the first contact part and the second contact part by the force applied by the elastic part in a timeframe when a temperature of the turbomachine component increases, wherein the first seal member and the second seal member are spaced apart from each other in the overlapping region to define a tortuous channel therebetween to form the sealed state of the seal part.

2. The impingement insert according to claim 1, wherein the elastic part and the first and the second body parts are formed integrally.

3. The impingement insert according to claim 1, wherein the elastic part has a bent plate shape, and is positioned between the first and the second body parts to define, along with the seal part, the flow channel.

4. The impingement insert according to claim 1, wherein the seal part is configured to maintain a sealed state while the separation between the first contact part and the second contact part is increased or decreased resulting from a deformation of the elastic part or from the force applied by the elastic part.

5. The impingement insert according to claim 1, wherein the first seal member and/or the second seal member are configured to move in a to-and-fro direction relative to each other while maintaining the tortuous channel.

6. The impingement insert according to claim 1, wherein at least one of the first seal member and the second seal member has a corrugated shape having at least one groove and is configured to receive a part of the other of the first seal member and the second seal member to form an interdigitated arrangement in the overlapping region thereby forming the sealed state of the seal part.

7. The impingement insert according to of claim 1, wherein the first seal member comprises a first surface and the second seal member comprises a second surface, wherein the first and the second surfaces face each other in the overlapping region; and
   wherein the first seal member comprises one or more first protrusions (841*p*) extending from the first surface towards the second surface; and/or
   wherein the second seal member comprises one or more second protrusions (842*p*) extending from the second surface towards the first surface.

8. A turbomachine component for a gas turbine, the turbomachine component comprising:
   an airfoil having an airfoil wall defining an internal space of the airfoil;
   at least one cooling channel formed in the internal space of the airfoil; and
   an impingement insert inserted in the cooling channel,
   wherein the impingement insert is according to claim 1, and wherein the first and the second contact parts are in contact with the airfoil wall.

9. The turbomachine component according to claim 8, wherein the elastic part of the impingement insert is in deformed state due to the first and the second contact parts being in contact with the airfoil wall.

10. The turbomachine component according to claim 8, wherein the turbomachine component is a blade or a vane of a gas turbine.

11. The turbomachine component according to claim 8, wherein the elastic part and the first and the second body parts are formed integrally.

12. The turbomachine component according to claim 8, wherein the elastic part has a bent plate shape, and is positioned between the first and the second body parts to define, along with the seal part, the flow channel.

13. The turbomachine component according to claim 8, wherein the seal part is configured to maintain a sealed state while the separation between the first contact part and the second contact part is increased or decreased resulting from a deformation of the elastic part or from the force applied by the elastic part.

14. A gas turbine comprising a turbomachine component, wherein the turbomachine component is according to claim 8.

* * * * *